US008347515B2

(12) United States Patent
Lee et al.

(10) Patent No.: US 8,347,515 B2

(45) Date of Patent: Jan. 8, 2013

(54) EXTERNAL-COUPLED ELECTRONIC ANGLE MEASUREMENT APPARATUS

(75) Inventors: Ming-Hwa Lee, Taichung County (TW); Xiu Jiang, Miaoli County (TW)

(73) Assignee: Eclatorq Technology Co., Ltd., Tanzih Township, Taichung County (TW)

( * ) Notice: Subject to any disclaimer, the term of this patent is extended or adjusted under 35 U.S.C. 154(b) by 459 days.

(21) Appl. No.: 12/791,269

(22) Filed: Jun. 1, 2010

(65) Prior Publication Data

US 2011/0291647 A1 Dec. 1, 2011

(51) Int. Cl.
*G01B 7/30* (2006.01)

(52) U.S. Cl. .............................. 33/334; 33/1 PT; 33/534

(58) Field of Classification Search .................... 33/1 N, 33/1 PT, 263, 334, 534
See application file for complete search history.

(56) References Cited

U.S. PATENT DOCUMENTS

| | | | | |
|---|---|---|---|---|
| 5,163,228 | A * | 11/1992 | Edwards et al. | 33/1 N |
| 5,589,644 | A | 12/1996 | Becker et al. | |
| 7,082,866 | B2 * | 8/2006 | Becker | 73/862.23 |
| 7,565,844 | B2 * | 7/2009 | Crass et al. | 73/862.21 |
| 7,721,631 | B2 * | 5/2010 | Berg et al. | 73/862.21 |
| 8,065,806 | B2 * | 11/2011 | Rainone et al. | 33/1 PT |
| 8,171,828 | B2 * | 5/2012 | Duvan et al. | 73/862.21 |
| 2004/0068880 | A1 * | 4/2004 | Bone et al. | 3/334 |
| 2009/0133271 | A1 * | 5/2009 | Sano | 33/1 PT |

* cited by examiner

*Primary Examiner* — G. Bradley Bennett
(74) *Attorney, Agent, or Firm* — Muncy, Geissler, Olds & Lowe, PLLC

(57) ABSTRACT

The present invention proposes an external-coupled electronic angle measurement apparatus including a housing, a display element, an angle detection system and a coupling portion. The housing is movable through the coupling portion to fasten the external-coupled electronic angle measurement apparatus to a desired location of different hand tools to accurately measure turning angles of a screw driven by the hand tool through the angle detection system and display the result on the display element.

20 Claims, 13 Drawing Sheets

EXTERNAL-COUPLED ELECTRONIC ANGLE MEASUREMENT APPARATUS

FIELD OF THE INVENTION

The present invention relates to an external-coupled apparatus of a hand tool and particularly to an external-coupled measurement apparatus to measure turning angles of a hand tool.

BACKGROUND OF THE INVENTION

An U.S. Pat. No. 5,589,644 discloses a wrench 1*c* for measuring turning angles, referring to FIG. 1, which can detect turning angles of a coupler 1*c*' of a driving head of the wrench 1*c* through an angle detection system 7, and calibrate fastening tightness of a work piece according to the turning angles of the wrench. The angle detection system is applicable only to the specific wrench 1*c* and not adaptable to other tools or changeable in terms of use positions arbitrarily, hence results in a higher production cost, and also is more complicated in structure. Thus its usability is limited.

FIG. 2 illustrates another embodiment of the wrench 1*d* for measuring turning angles according to U.S. Pat. No. 5,589,644 that has an angle detection system 8 to detect the turning angles of a coupler 1*d*' of the driving head thereof. The angle detection system is embedded in the wrench 1*d* and cannot be shared with other tools, thus its applicability also is limited.

SUMMARY OF THE INVENTION

Therefore, the primary object of the present invention is to provide a measurement apparatus mountable onto a wide variety of hand tools to measure turning angles thereof and enhance usability and adaptability.

The invention provides an external-coupled electronic angle measurement apparatus which comprises a housing, a coupling portion, an angle detection system and a display element. The coupling portion is located on the housing to fasten the external-coupled electronic angle measurement apparatus to a tool. The angle detection system is held in the housing to detect turning angles. The display element is electrically connected to the angle detection system to display the turning angles.

Through the coupling portion, the invention can be easily and quickly installed on different hand tools. The angle detection system can accurately measure the turning angles of a screw driven by the hand tool.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
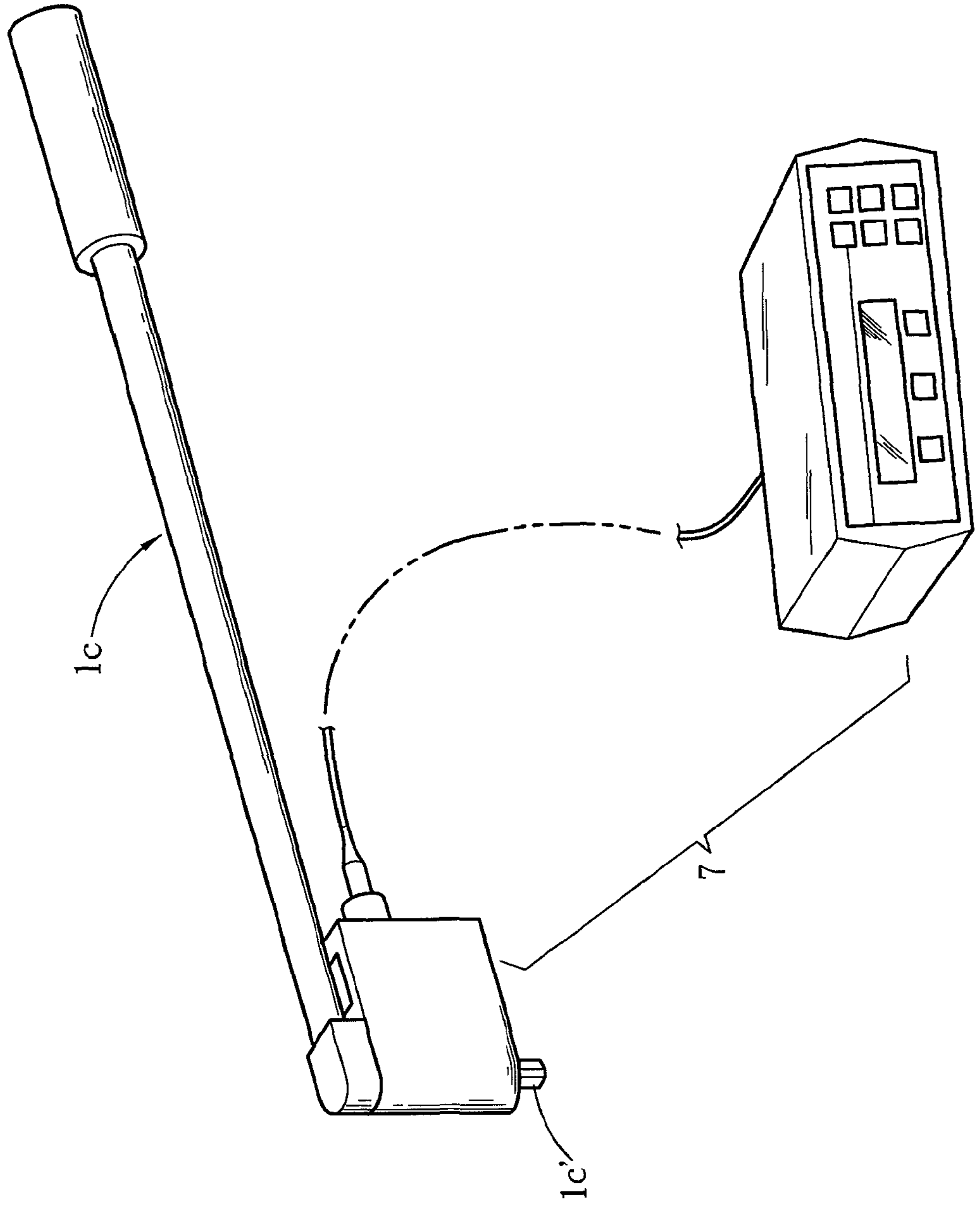
Fig. 1 PRIOR ART
FIG. 1 is a perspective view of U.S. Pat. No. 5,589,644.
Figure 2:
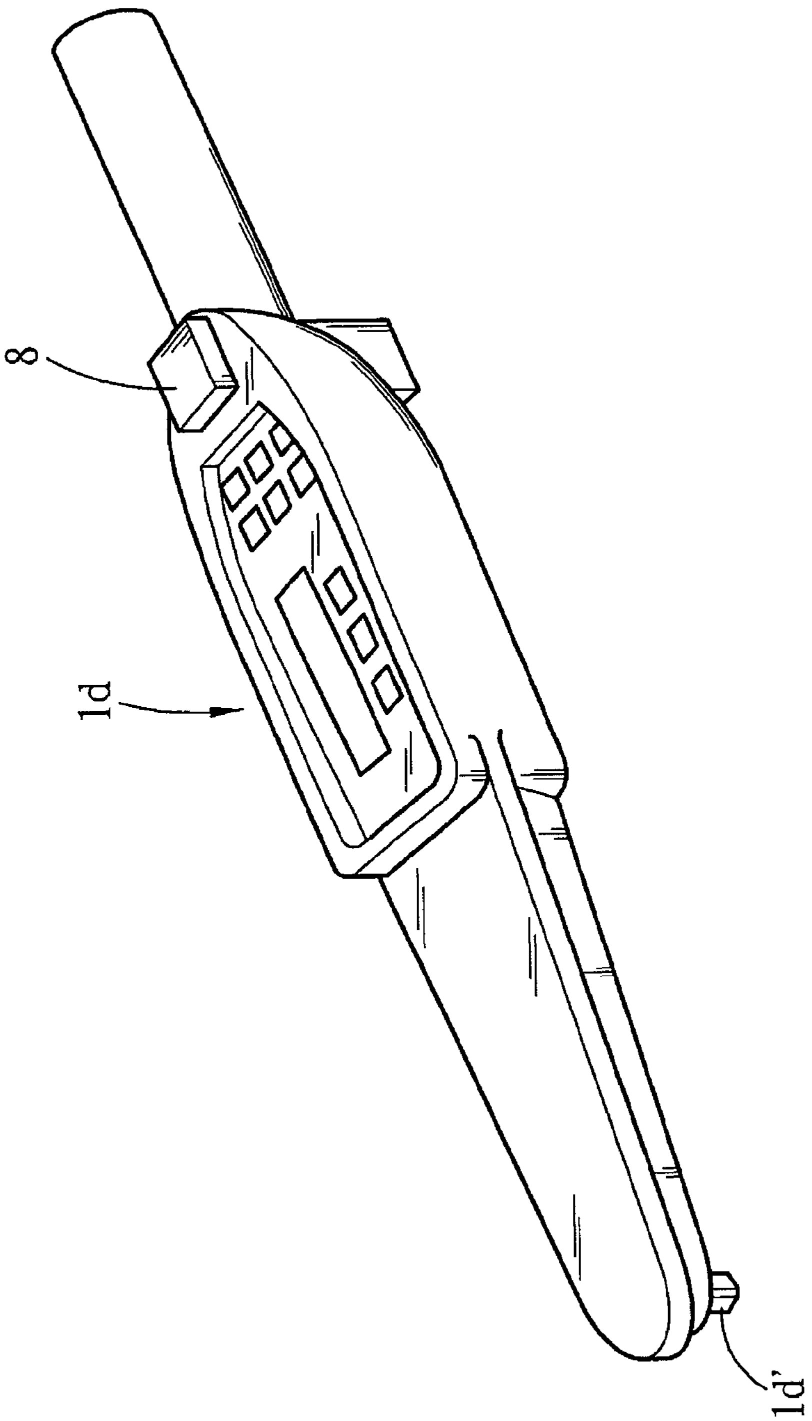
Fig. 2 PRIOR ART
FIG. 2 is another perspective view of U.S. Pat. No. 5,589,644.
Figure 3:
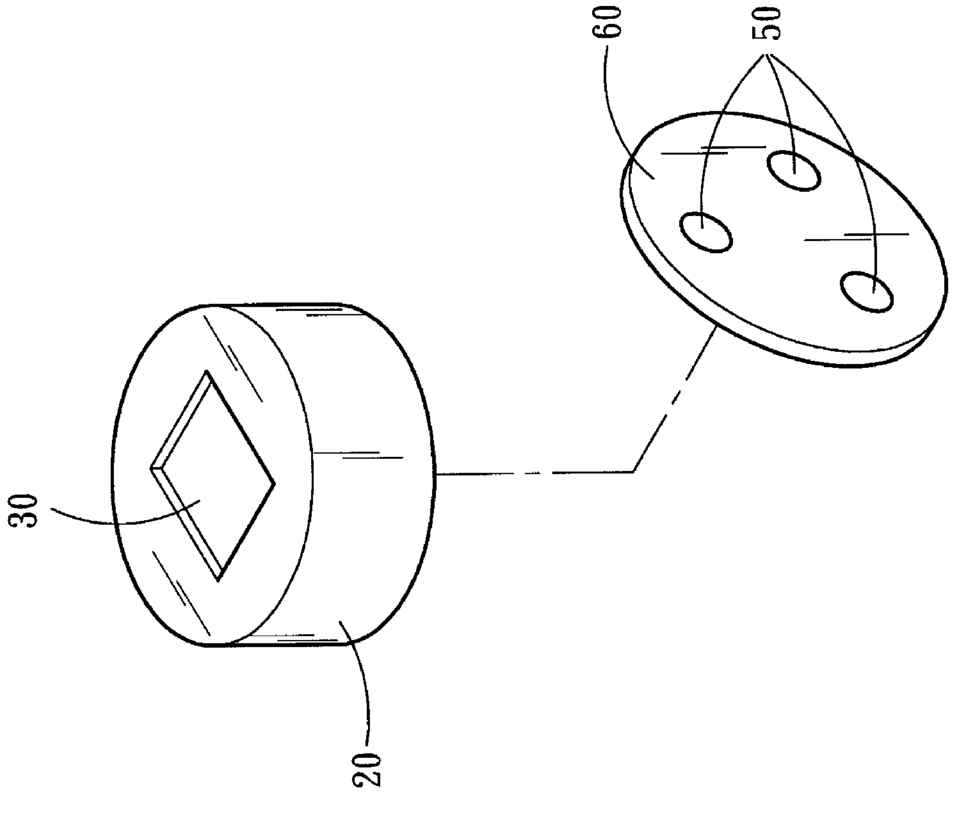
FIG. 3 is a perspective view of the invention.
Figure 4:
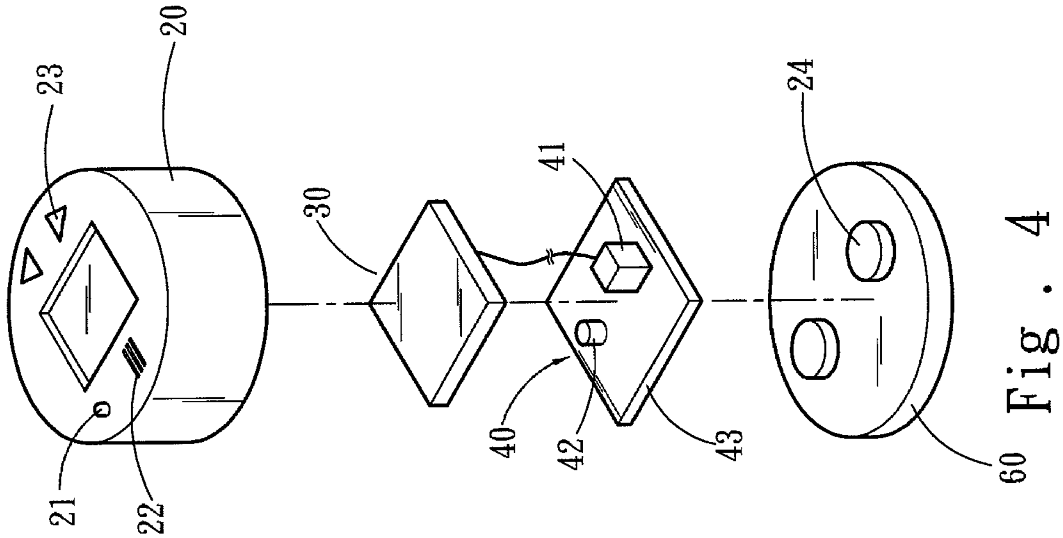
FIG. 4 is an exploded view of the invention.
Figure 5:
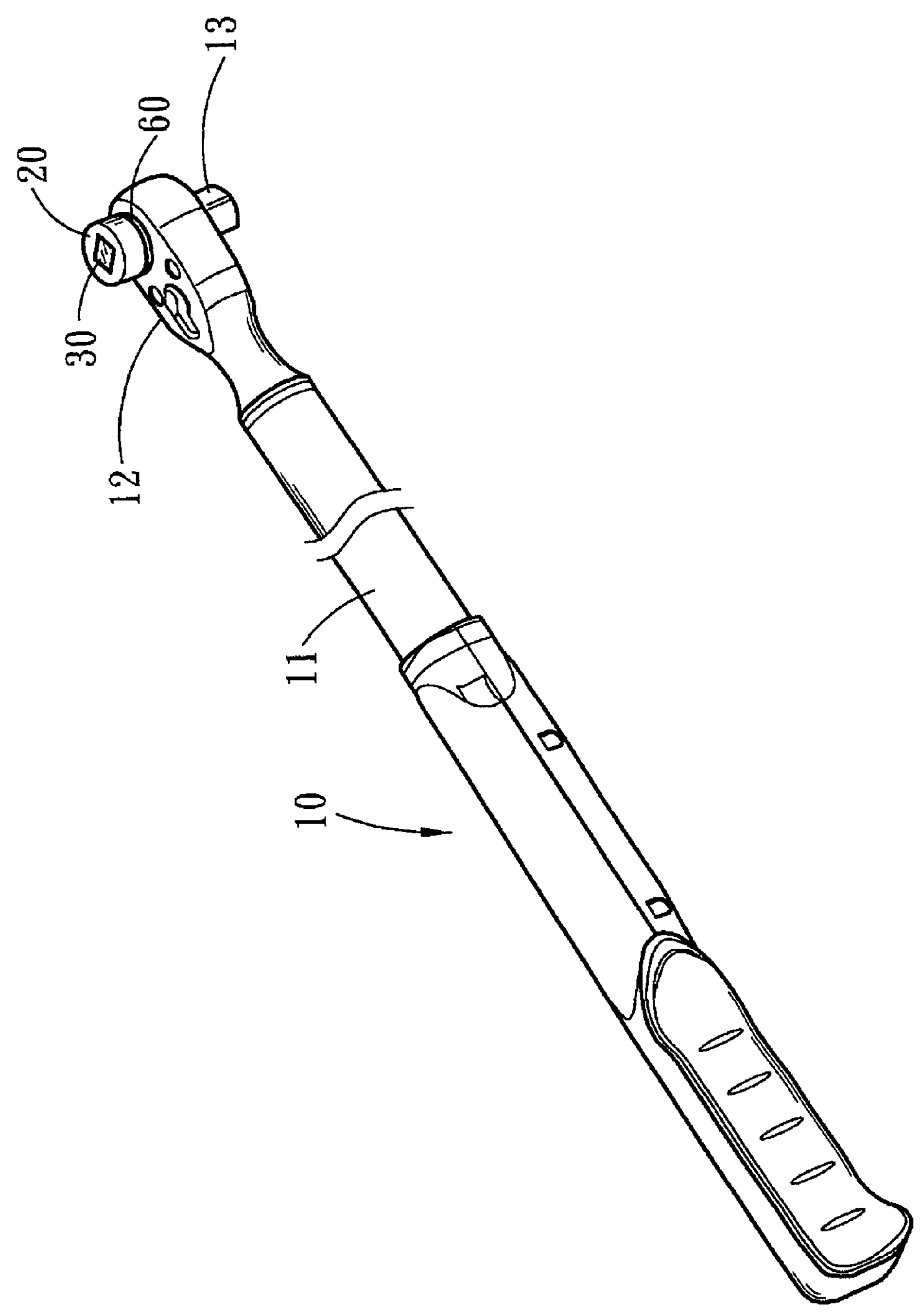
FIG. 5 is a perspective view of an embodiment of the invention.

Please refer to FIGS. 3, 4 and 5 for an embodiment of the invention. The apparatus of the invention is installed on a hand tool 10 which has a driving bar 11 with a driving head 12 at one end and a sleeve coupling head 13 at one side of the driving head 12 to fasten a screw. The external-coupled electronic angle measurement apparatus includes a housing 20, a display unit 30, an angle detection system 40 and a coupling portion 50. The housing 20 has a holder 60 at the bottom. The coupling portion 50 is an adsorbable element and is fastened to the holder 60, thus the apparatus of the invention can be quickly and movably mounted onto the driving head 12 or the driving bar 11 or the hand tool 10 at a desired location.

The angle detection system 40 is held in the housing 20 to detect turning angles of the sleeve coupling head 13, and includes an electronic angle measurement device 41 and a signal processing system 42, and is installed on a circuit board 43. The electronic angle measurement device 41 can be a gyroscope. The display element 30 is located on the housing 20 and electrically connected to the angle detection system 40 to display the turning angles of the sleeve coupling head 13.

The housing 20 may include a lighting element 21, a buzzer 22 and a setting button 23 which can set turning angles or parameters or related information. The lighting element 21 and buzzer 22 provide alarm function to issue alerts when the turning angles have met requirements. The housing 20 also holds a battery 24 to provide electric power when in use.

Figure 7:
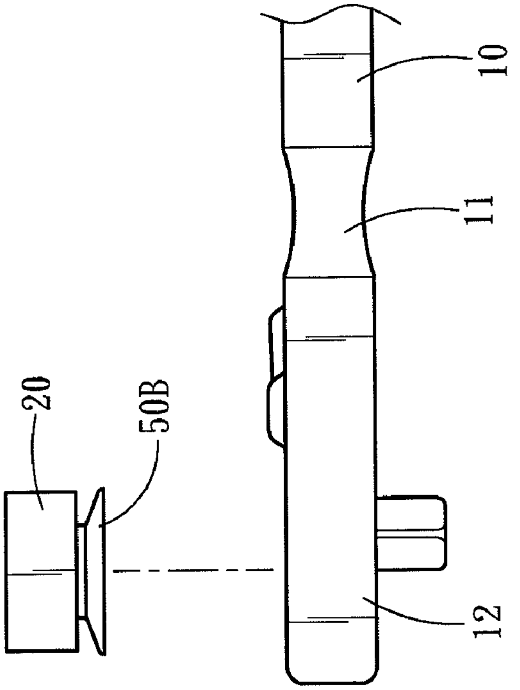
FIG. 7 is a plane view of yet another embodiment of the invention.
Figure 6:
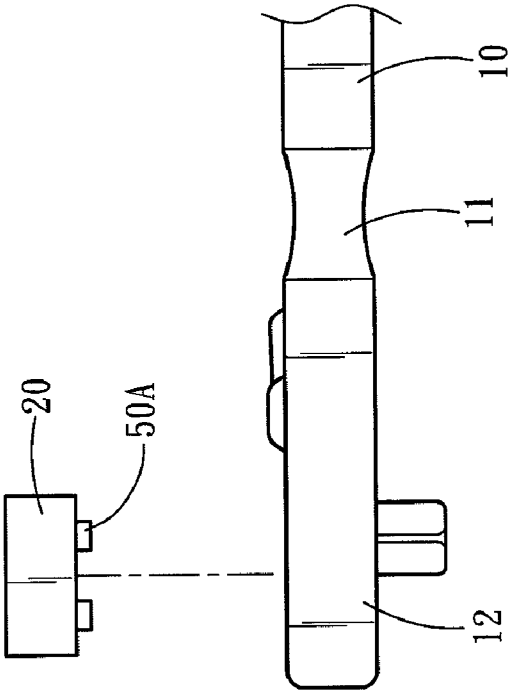
FIG. 6 is a plane view of another embodiment of the invention.
Figure 8:
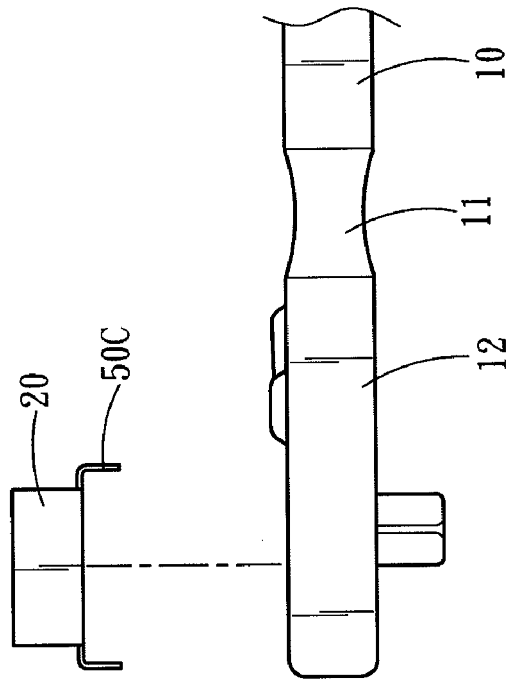

Refer to FIG. 6 for another embodiment of the invention. The coupling portion 50A can be a magnetic element. FIG. 7 shows yet another embodiment in which the coupling portion 50B can be a sucking disc. FIG. 8 shows one of other embodiments that the coupling portion 50C can be a gripper. Through adsorption of the s magnetic element or sucking disc, or clipping of the gripper, the external-coupled electronic angle measurement apparatus can be fastened on the driving head 12, driving bar 11 or hand tool 10 at a desired location.

Figure 9:
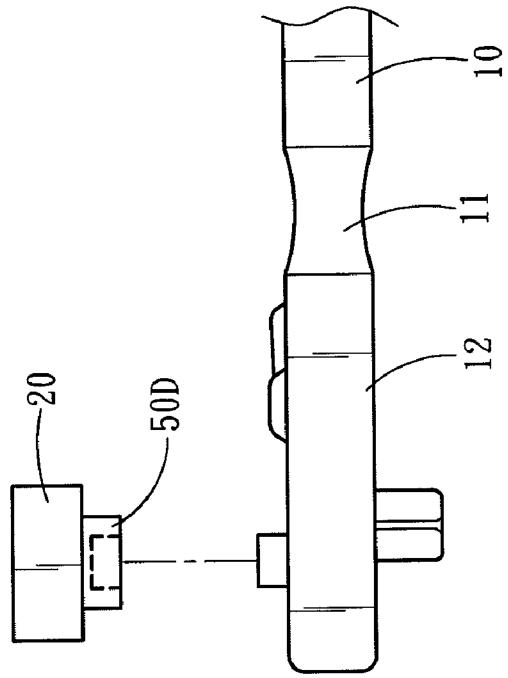
FIGS. 8 through 14D are plane views of other embodiments of the invention.
Figure 10:
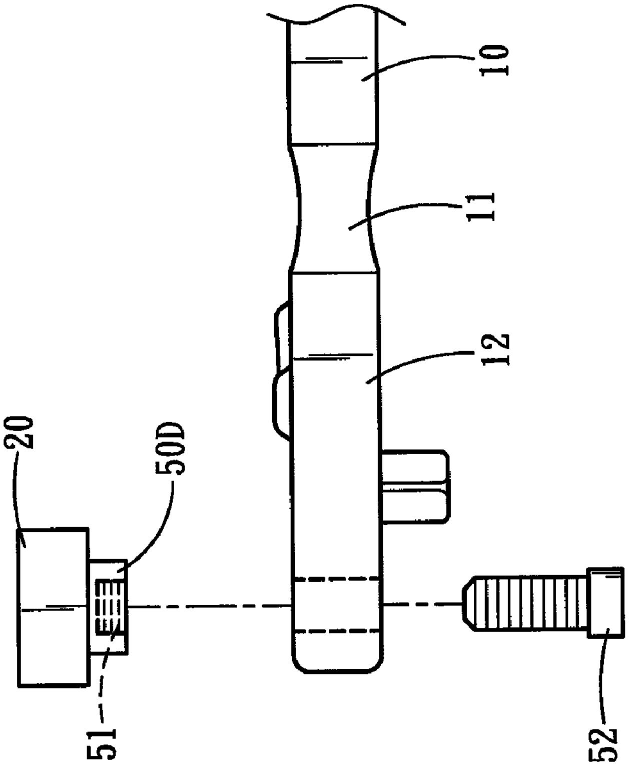

FIG. 9 illustrates another embodiment of the invention in which the coupling portion 50D can be at least one cavity to be wedged in by a mating boss or profile formed on the driving head 12, driving bar 11 or hand tool 10 at a desired location. The cavity and boss or profile are not limited to exactly the same profile, partially matched and mutually latched can hold the apparatus of the invention. FIG. 10 shows yet another embodiment in which the coupling portion 50D has screw threads 51 formed on the surface of the cavity to allow the apparatus to be fastened through a screw 52.

Figure 11:
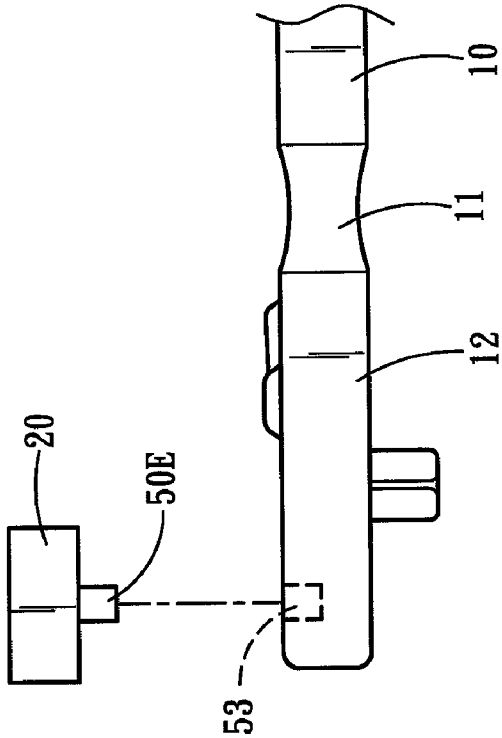
Figure 12:
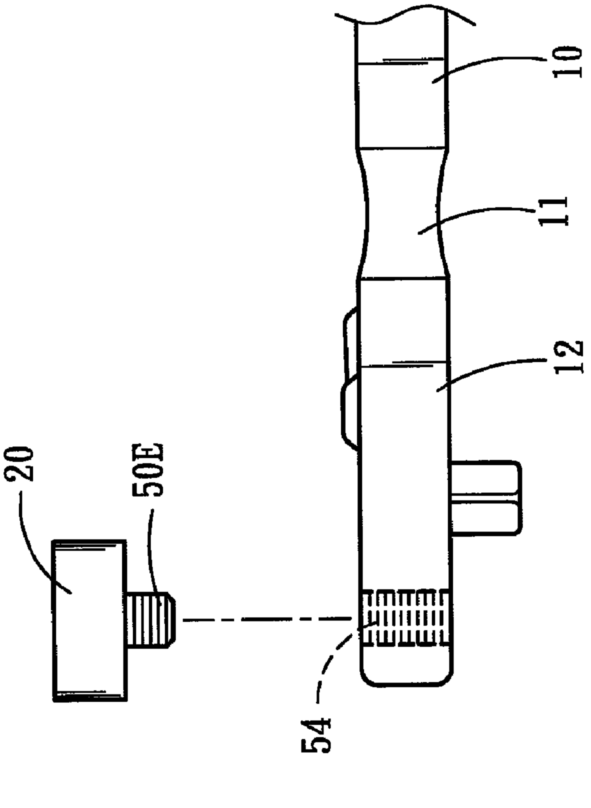
Figure 14B:
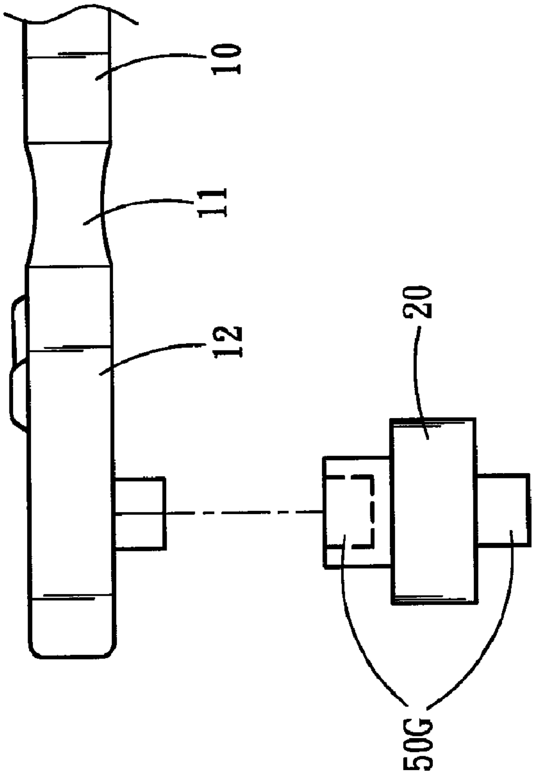
Figure 14A:
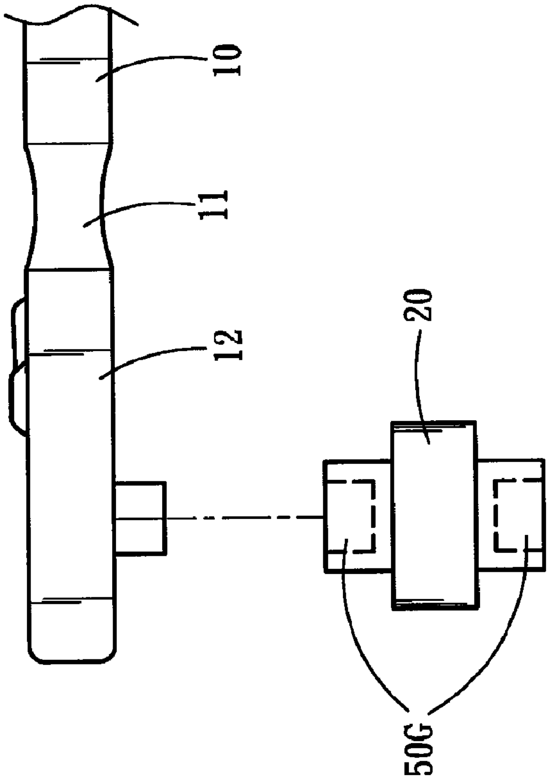
Figure 14D:
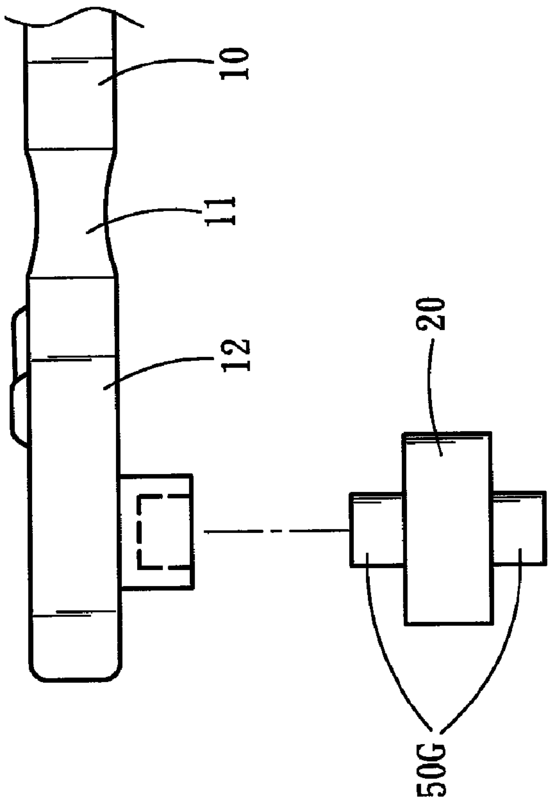
Figure 14C:
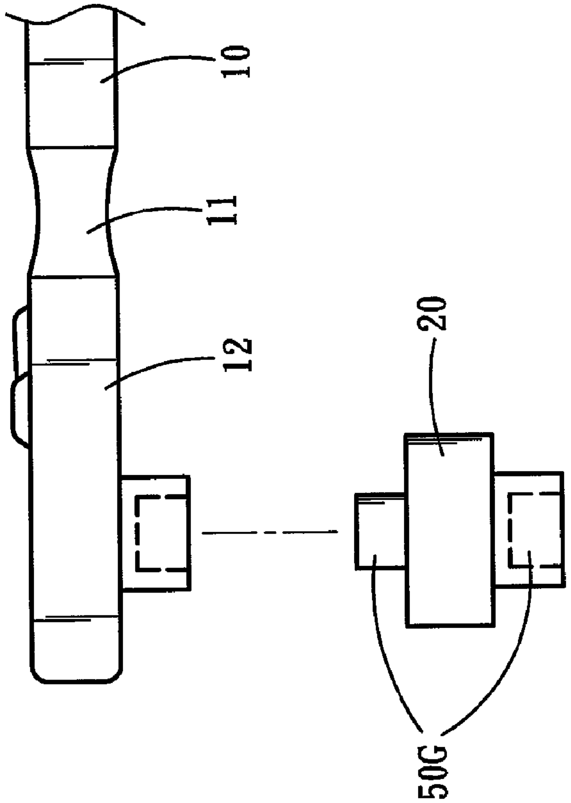

FIG. 11 shows another embodiment in which the coupling portion 50E can be at least one boss to be wedged in a mating cavity 53 formed on the driving head 12, driving bar 11 or hand tool 10 at a desired location. The profiles of the boss and cavity 53 are not limited to the same, partially matched and mutually latched can hold the apparatus of the invention. FIG. 12 shows still another embodiment in which the coupling portion 50E has screw threads 54 formed on the surface of the boss to fasten the apparatus by screwing.

Figure 13:
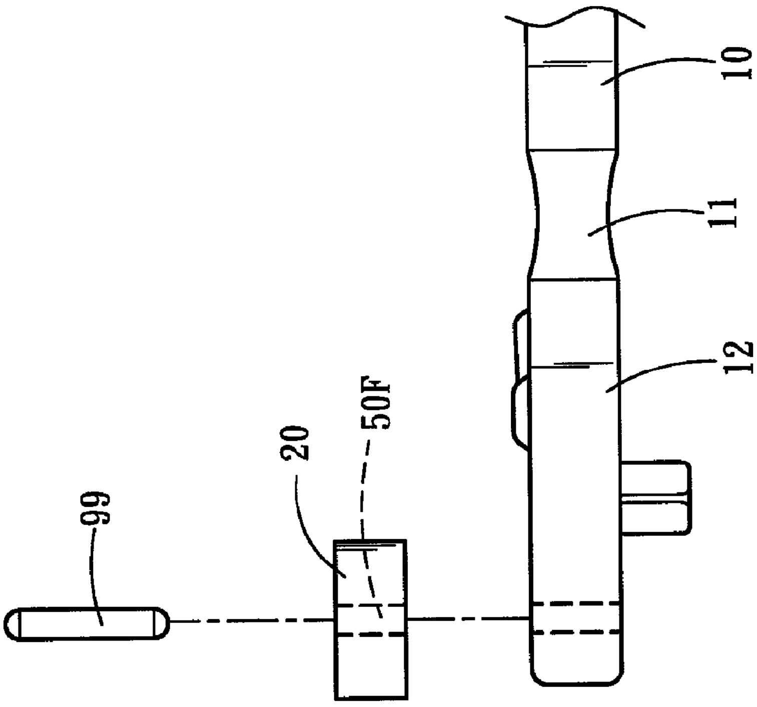

FIG. 13 shows yet another embodiment in which the coupling portion 50F can be one or more through holes to receive a fastening element 99 to fasten the apparatus of the invention.

FIGS. 14A through 14D illustrate other embodiments in which the coupling portion 50G includes two sets located at two opposite sides of the apparatus in an up and down, left and right, front and rear, or coaxial manner. The two sets of the coupling portion 50G at the two sides can be cavities both, bosses both or one cavity and one boss to be latched to fasten the apparatus in varying combinations.

Figure 15:
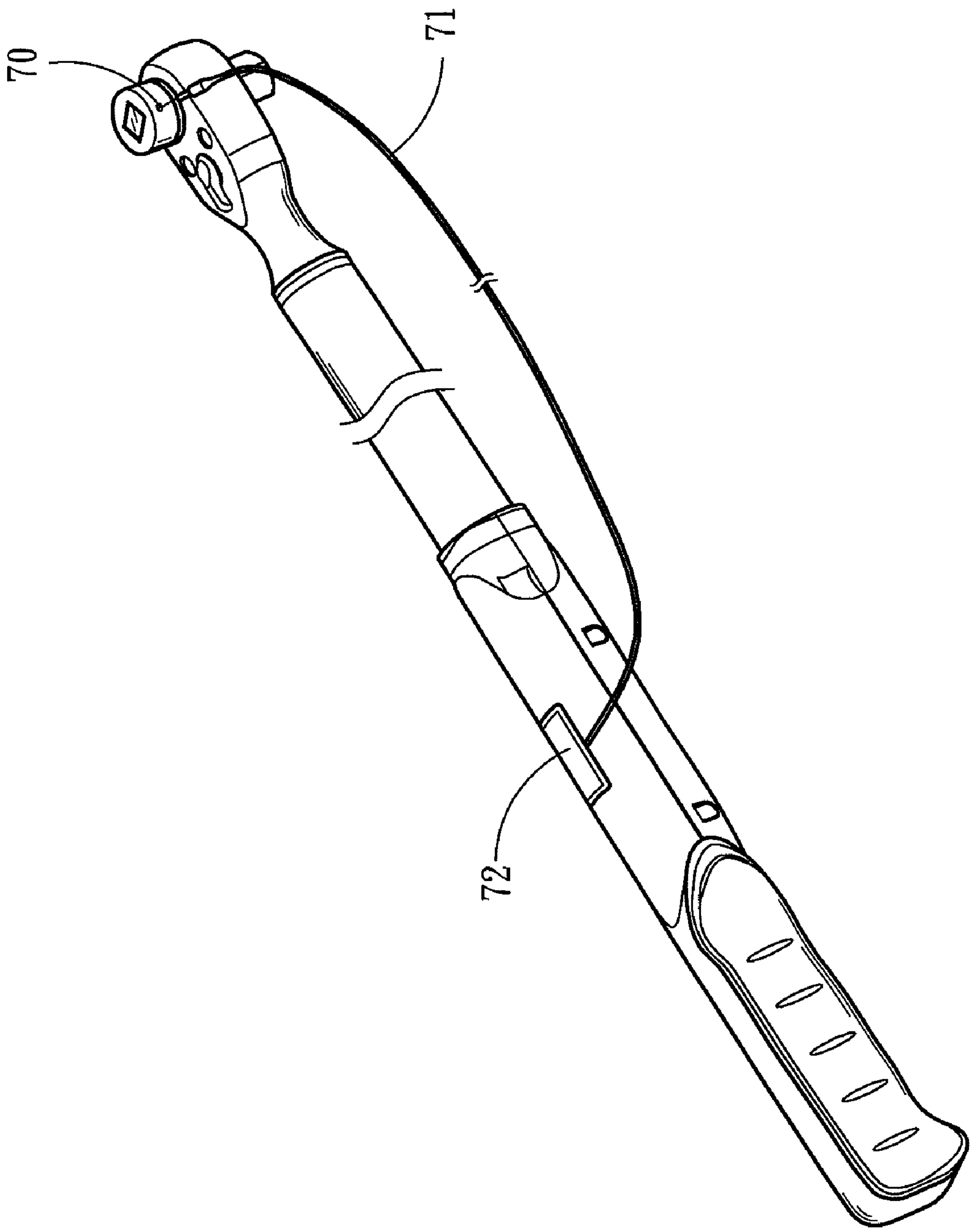
FIG. 15 is a perspective view of an embodiment of the invention to receive external information.
Figure 16:
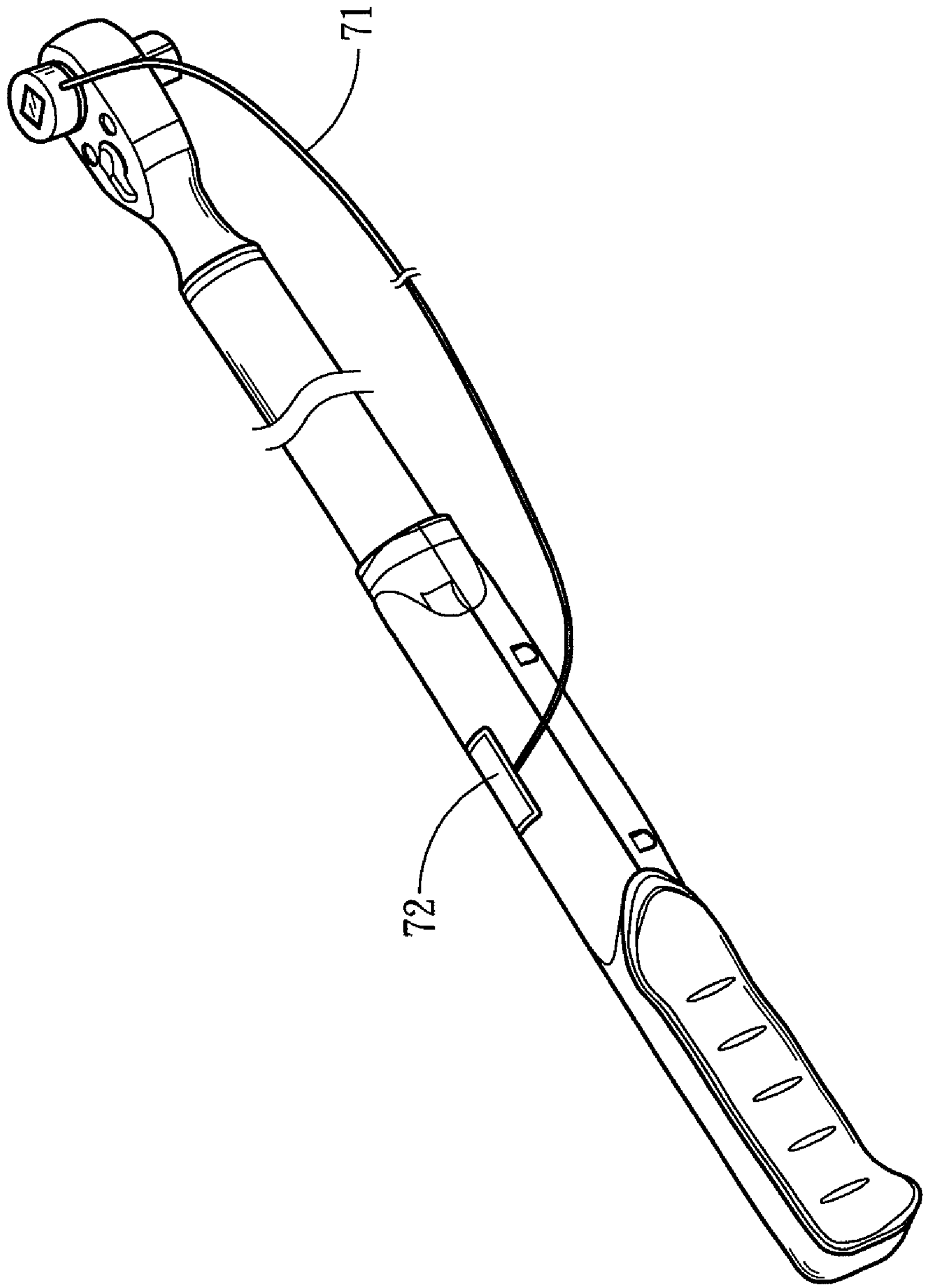
FIG. 16 is a perspective view of another embodiment of the invention to receive external information

Referring to FIG. 15, the apparatus of the invention also may include a communication port 70 connected to a signal providing portion 72 through a signal line 71. The signal providing portion 72 transmits related information or parameters to the apparatus of the invention through the signal line 71 and communication port 70. FIG. 16 shows yet another embodiment in which the signal line 71 can be directly included in the apparatus of the invention.

As a conclusion, when the hand tool 10 is turned, the angle detection system 40 measures the turning angles of the sleeve coupling head 13. Hence when measuring the turning angles is desired, fasten the apparatus of the invention on the driving head 12, driving bar or hand tool 10 at a desired location, and disassemble the apparatus when not in use. Such a structure provides greater adaptability and usability, and is easier to store and applicable to various types of hand tools.

What is claimed is:

1. An external-coupled electronic angle measurement apparatus, comprising:

a housing;

a coupling portion mounted onto the housing to fasten the external-coupled electronic angle measurement apparatus to a hand tool;

an angle detection system held in the housing to detect turning angles; and a display element electrically connected to the angle detection system to display the turning angles.

2. The external-coupled electronic angle measurement apparatus of claim 1, wherein the coupling portion is an adsorbable element.

3. The external-coupled electronic angle measurement apparatus of claim 1, wherein the coupling portion is a magnetic element.

4. The external-coupled electronic angle measurement apparatus of claim 3, wherein the magnetic element is a magnet.

5. The external-coupled electronic angle measurement apparatus of claim 1, wherein the coupling portion is a sucking disc.

6. The external-coupled electronic angle measurement apparatus of claim 1, wherein the coupling portion is a gripper.

7. The external-coupled electronic angle measurement apparatus of claim 1, wherein the coupling portion is a cavity.

8. The external-coupled electronic angle measurement apparatus of claim 7, wherein the cavity includes screw threads.

9. The external-coupled electronic angle measurement apparatus of claim 7, wherein the cavity is formed in a profile the same as that of the hand tool.

10. The external-coupled electronic angle measurement apparatus of claim 1, wherein the coupling portion is a boss.

11. The external-coupled electronic angle measurement apparatus of claim 10, wherein the boss includes screw threads.

12. The external-coupled electronic angle measurement apparatus of claim 1, wherein the coupling portion is a through hole.

13. The external-coupled electronic angle measurement apparatus of claim 1, wherein the coupling portion includes two sets located on two opposite sides of the external-coupled electronic angle measurement apparatus.

14. The external-coupled electronic angle measurement apparatus of claim 13, wherein the two sets of the coupling portion are positioned coaxially.

15. The external-coupled electronic angle measurement apparatus of claim 13, wherein two sets of the coupling portion are respectively a cavity and a boss.

16. The external-coupled electronic angle measurement apparatus of claim 1, wherein the housing holds at least one battery.

17. The external-coupled electronic angle measurement apparatus of claim 1, wherein the angle detection system includes a signal processing system and an electronic angle measurement device.

18. The external-coupled electronic angle measurement apparatus of claim 17, wherein the electronic angle measurement device is a gyroscope.

19. The external-coupled electronic angle measurement apparatus of claim 1 further comprising a communication port.

20. The external-coupled electronic angle measurement apparatus of claim 1 further comprising a signal line.

* * * * *